US006985548B1

(12) United States Patent
Jabbar et al.

(10) Patent No.: US 6,985,548 B1
(45) Date of Patent: Jan. 10, 2006

(54) SYSTEM AND METHOD FOR TIMING RECOVERY IN A DISCRETE MULTI-TONE SYSTEM

(75) Inventors: Farooq Jabbar, Parlin, NJ (US); Ehud Langberg, Wayside, NJ (US); Weimin Liu, Aberdeen, NJ (US)

(73) Assignee: Conexant Systems, Inc., Red Bank, NJ (US)

( * ) Notice: Subject to any disclaimer, the term of this patent is extended or adjusted under 35 U.S.C. 154(b) by 0 days.

(21) Appl. No.: 09/496,793

(22) Filed: Feb. 2, 2000

Related U.S. Application Data

(60) Provisional application No. 60/118,358, filed on Feb. 3, 1999.

(51) Int. Cl.
*H04L 7/00* (2006.01)
(52) U.S. Cl. .................. 375/355; 375/371; 375/373; 375/376
(58) Field of Classification Search ........... 375/222, 375/260, 201, 355; 370/208, 465; 360/77.14; 348/515, 536; 331/25
See application file for complete search history.

(56) References Cited

U.S. PATENT DOCUMENTS

| | | | | |
|---|---|---|---|---|
| 5,627,863 A | * | 5/1997 | Aslanis et al. .......... 375/357 |
| 5,867,528 A | * | 2/1999 | Verbueken ............ 375/222 |
| 5,982,237 A | * | 11/1999 | Pax et al. .............. 331/1 A |
| 6,088,386 A | * | 7/2000 | Spruyt et al. .......... 375/222 |
| 6,101,230 A | * | 8/2000 | Chun et al. ............ 375/355 |
| 6,236,675 B1 | * | 5/2001 | Bedingfield et al. .... 375/222 |
| 6,404,774 B1 | * | 6/2002 | Jenness ................ 370/465 |

* cited by examiner

*Primary Examiner*—Stephen Chin
*Assistant Examiner*—Curtis Odom
(74) *Attorney, Agent, or Firm*—Thomas, Kayden, Horstemeyer & Risley

(57) ABSTRACT

A system and method for performing pilot tone based timing recovery in a communication system using the discrete multi-tone (DMT) modulation. In DMT modulation, interference is introduced to the phase of the pilot tone in the transmitter due to the cyclic prefix. Broadly, a receiver is configured to detect and apply a phase offset to the pilot tone in a phase locked-loop upon recognition of far-end signal segments during transceiver initialization. The output of the phase locked-loop is then used to control the timing of the analog-to-digital (A/D) and digital-to-analog (D/A) conversions. In alternative embodiments, the receiver is configured to detect and remove the cyclic prefix from the far-end signal either prior to, or after, time-domain equalization. In a similar manner, the resulting signal stream is applied to the input of the timing recovery phase locked-loop (PLL). The output of the PLL is used to control the timing of the A/D and D/A converters. In a further alternative embodiment, a phase error on the pilot tone is estimated in the frequency domain. The phase error is then applied to the input of a modified timing recovery PLL to reduce phase interference on the pilot tone.

22 Claims, 13 Drawing Sheets

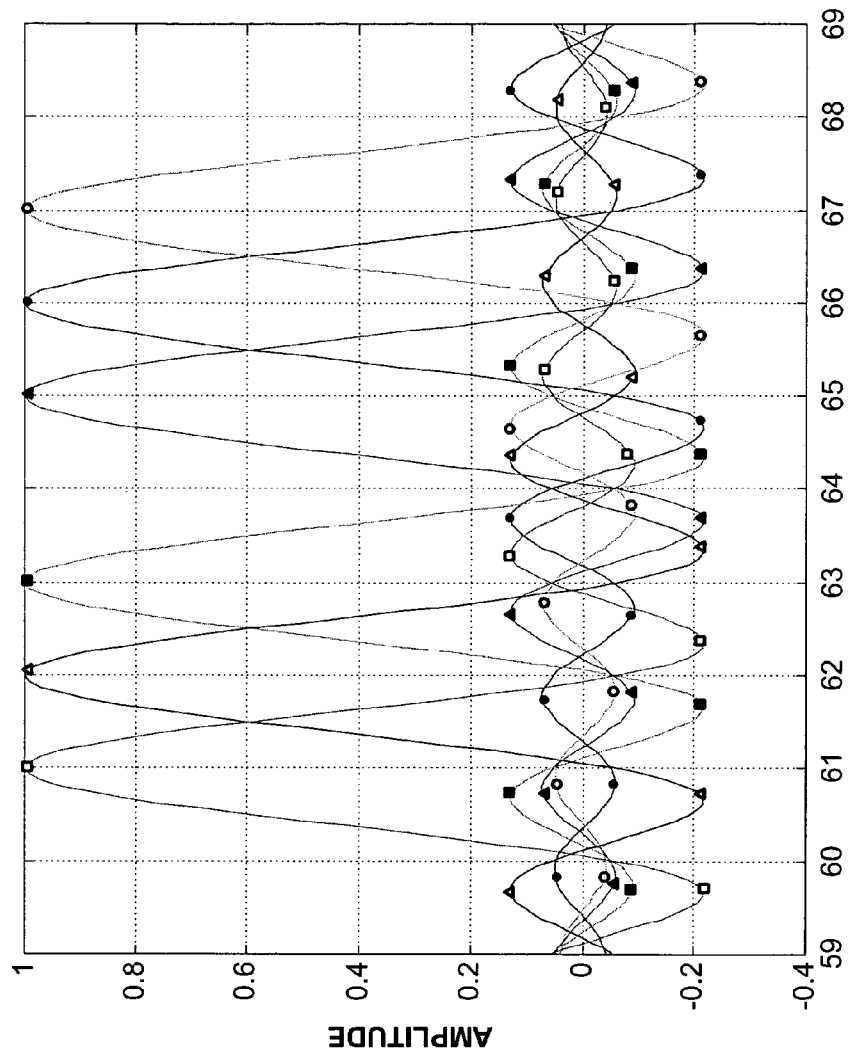

SYSTEM AND METHOD FOR TIMING RECOVERY IN A DISCRETE MULTI-TONE SYSTEM

CROSS-REFERENCE TO RELATED APPLICATION

The present application claims the benefit of U.S. provisional patent application Ser. No. 60/118,358, filed Feb. 3, 1999, which is hereby incorporated by reference in its entirety.

BACKGROUND OF THE INVENTION

1. Field of the Invention

The present invention generally relates to communication systems, and more particularly, to a system and method for timing recovery in digital subscriber line (DSL) communication systems using the discrete multi-tone (DMT) modulation and standard.

2. Discussion of the Related Art

In recent years, telephone communication systems have expanded from traditional plain old telephone system (POTS) communications to include high-speed data communications as well. As is known, POTS communications include the transmission of voice information, control signals, PSTN (public switched telephone network) information, as well as, information from ancillary equipment in analog form (i.e. computer modems and facsimile machines) that is transmitted in the POTS bandwidth.

Prompted largely by the desire of businesses to reliably transfer information over a broadband network, telecommunications service providers have employed DSL systems to provide a plethora of interactive multi-media digital signals over the same existing twisted-pair copper lines. The provision of asynchronous digital subscriber line (ADSL) systems, using DMT line coding, to customer premises has proliferated over recent years due to the increasing demand for high speed Internet access. ADSL systems can be designed to operate over the same copper lines with either the POTS or a Basic Access Integrated Service Digital Network (ISDN-BA) service.

In a basic DMT implementation, an ADSL transmission unit—central office (ATU-C) is configured to modulate and convert digital data for analog transmission from a central office downstream to a remote location. Each DSL customer is provided an ADSL transmission unit—remote (ATU-R) configured to receive the analog transmission from the telephone line. The ATU-R demodulates the signals and applies error correction before delivering each of the reconstructed digital data signals to its intended device. Concurrently, the ATU-R transmits data from the customer upstream to the central office.

DMT ADSL systems, as defined in the standards, use a transmission bandwidth of up to 1,104 KHz, which is divided into 256 sub-carriers, sometimes referred to as bins or tones. Each of the bins or tones has a center frequency located at an integer multiple of 4.3125 KHz. Generally, certain bins are unused to prevent interference into the POTS or ISDN-BA service, while a larger subset of the bins are used by the downstream transmission. A small subset of the bins is used by the upstream transmission.

The actual transmission spectrum used by a DMT system is adjusted according to the desired data rate based on the transmission characteristics of the particular channel. A DMT communications system initializes by the ATU-C transmitting up to 256 sub-carriers downstream to the ATU-R. The ATU-R measures the quality of each of the sub-carriers and decides whether each particular sub-carrier has a sufficient signal-to-noise ratio (SNR) to be used for service transmission and, if so, how much data each particular sub-carrier should carry relative to the other sub-carriers. After processing the received signals, the ATU-R communicates an optimized bit distribution scheme to the ATU-C via the upstream channel. A bit distribution optimization for upstream transmission is similarly accomplished in the initialization process.

In the ADSL standard, the incoming data streams from each of the possibly separate data services are coded through the use of forward error correcting (FEC) codes, and optionally, the use of trellis coding. The resultant bits parse into groups of $b_i$, i=0, ..., 255 for each tone at the output of the encoder. The result of the coding is a two-dimensional, or complex, quantity, $X_i$ that consists of a real part and an imaginary part. There are $2b_i$ such complex values for the $i^{th}$ tone, one for each of the $2b_i$ input bit patterns for that tone, dictating its amplitude and phase. The process of encoding repeats for each of the 256 channels 4000 times per second. An inverse discrete Fourier transform (IDFT) of the size 512 (complex to real) converts the complex samples ($X_i = X^*_{512-i}$, i=0, ..., 255, where * denotes a complex conjugate) into a real sequence of 512 samples $x_i$. The sequence represents the sum of modulated sinusoids. The formula for the IFFT is, $$x_k = \frac{1}{\sqrt{512}} \sum_{n=0}^{511} X_n W^{kn}, \text{ where } W = e^{j\frac{\pi}{256}}. \qquad \text{Eq. (1)}$$

Except briefly during initialization, each sample block, or symbol, is transmitted with a cyclic prefix, containing the last 32 samples of the transmit symbol repeated in a prefix that begins each symbol, resulting in 512+32=544 samples per symbol.

Each such prefixed symbol is transmitted 4000 times per second. For reliability, a dummy synchronization symbol of 544 samples is inserted every $69^{th}$ symbol, so that the aggregate sampling rate at the ATU-C transmitter is (544)(4000)(69/68)=2.208 M samples per second.

The upstream data path is similar, except that a 64-point (128-point optional for ADSL over ISDN-BA) IFFT is used with a prepending of 4 (8 optional for ADSL over ISDN-BA) samples rather than the 512 IFFT with a prepending of 32 symbols used in the downstream path. As a result, the upstream sampling rate in the ATU-R is 276 K samples per second (552 K samples per second for ADSL over ISDN-BA). In order to ensure successful transmission of data in both the downstream and upstream directions, the transmitter and receiver sampling clocks must be synchronized in what is called loop-timing or timing recovery.

When the ATU-R is to provide loop-timing, the goal of timing recovery is to synchronize the ATU-R signal-sampling clock with the ATU-C's sampling clock. Timing recovery is necessary because the exact frequency and phase of the ATU-C is not known beforehand at the ATU-R and because the sampling clock at the ATU-C itself cannot be made exact due to variations in physical devices. After timing recovery has successfully aligned the ATU-C transmitter and ATU-R receiver clocks, synchronization of the upstream signal becomes possible because the ATU-R's analog to digital converter (ADC) and digital to analog converter (DAC) clocks can be synchronized using any of a number of methods known in the art. Alternatively, loop-timing can be provided by the ATU-C instead.

When the frequency (not just the phase) of the ATU-R sampling clock is offset from the frequency of the ATU-C's sampling clock, a number of synchronization mechanisms and phase error generation methods are possible. Two such synchronization mechanisms are pilot timing and "rotors."

Pilot Timing

In ADSL, the ATU-C transmits a pilot tone at 276 kHz (tone or bin 64 for ADSL over POTS, or bin 96, 414 KHz, for ADSL over ISDN) that is intended to have a constant phase of 45 degrees. Offsets at the output of the ATU-R FFT on this tone from the intended nominal phase of 45 degrees is a phase error that can be used to drive a phase locked-loop to control the sampling clock. The accuracy of the sampling clock must be that any residual phase error noise does not interfere with data transmission. It can be shown that for a signal to noise ratio in excess of 50 dB, the sampling phase deviation should be 500 ps or less. Such a deviation imposes a need for a crystal-based, analog, voltage controlled oscillator if analog phase locking is used.

Rotors

Another form of timing recovery is known as rotors. With rotors, a crystal with a center frequency near the 2.208 MHz sampling rate of ADSL, or a multiple of it, is used to sample the incoming data stream at the ATU-R. The phase error generated from the pilot tone is used to rotate each of the incoming tones by a linearly increasing phase offset determined from an estimate of the timing-offset error. This method assumes that the frequency offset within any symbol period is constant. In practice, this requires a transmit crystal sampling clock with an accuracy of 5 PPM or better. Since a frequency offset will gradually grow over time, a sample will need to be added or deleted from the ATU-R's deletion of the cyclic prefix. While this technique avoids the cost of a highly accurate voltage controlled crystal oscillator, it results in the need for an accurate match of transmit and receive crystals to ensure that the timing offset is within a single symbol of 250 µs. It is significant to note that when the ATU-R is not configured to loop time, that is, synchronize the ADC and DAC clocks, a second pilot tone is necessary to synchronize timing in the upstream direction. ADSL standard tone 16 at 69 kHz has been designated as the upstream pilot tone. A similar timing recovery mechanism can then be implemented in the ATU-C for upstream data, although frequency tolerances are typically relaxed with respect to those in the downstream direction.

Interference to the Pilot Tone Phase

The DMT standards specify that all signals be modulated with the use of inverse discrete Fourier transforms (IDFT). The downstream pilot tone is at bin 64 (276 kHz, ADSL over POTS) and all signal segments shall have this bin overwritten by a 45° complex value of 1+j. The resulting pilot tone signal should have a phase of 45° regardless of the signals appearing in the other bins. This is indeed the case when there is no cyclic prefix. With bin spacing of exactly 4.3125 kHz, a 512-point Fourier transform makes all 256 bins orthogonal to each other. In other words, the SINC function for each bin due to the rectangular time domain windowing is exactly zero at all other bins (see FIGS. 4A and 4B).

However, orthogonality among the bins is destroyed when the 32-point cyclic prefix is introduced. This claim is counter-intuitive because, after all, 32 samples contain exactly 4 cycles of the pilot tone with no phase discontinuities. Nevertheless, the following analysis highlights the problem with pilot tone phase interference.

Consider, for example, the C-REVERB signal in which a fixed pseudo-random symbol is repeated again and again. If the cyclic prefix is introduced, it becomes a part of the repeated sample sequence. A repeated signal sequence has a line spectrum, represented by the Fourier series, which can be found by taking the discrete Fourier transform (DFT) on only one sequence of the samples repeated in the signal. With the cyclic prefix present, the sequence being repeated is 544 samples long, rather than 512 samples, so a 544-point DFT must be applied to find the Fourier series. As a result, the original 256 bins are no longer orthogonal to each other. In other words, the SINC function for each bin is generally nonzero at other bin locations (see FIGS. 5A and 5B). With a line spacing of approximately 4.0588 kHz, the pilot tone comes out in bin 68 and it will have contributions from other bins. Generated according to the DMT standards, the pilot tone in C-REVERB with cyclic prefix will be at 55.91°, or a deviation of +10.91° from the intended 45°. Similarly, the pilot tone in C-SEGUE with cyclic prefix will be at 29.83°, or a deviation of −15.17°. Not surprisingly, C-PILOT is at exactly 45°, with or without cyclic prefix. C-MEDLEY and SHOWTIME signals have random phase interference in each symbol and should average to zero.

It is significant to note that this pilot tone phase interference is not related to the communication channel, since it is generated in the ADSL transmitter itself. No matter how narrow a band-pass filter is used, the phase deviations remain.

Accordingly, it is desired to provide a system and method that efficiently, accurately, and quickly reduces phase interference on the DMT pilot tone at a receiving unit in a DMT communications system.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention provides a system and method for reducing the pilot tone phase interference at a receiver in a DMT communication system. Briefly described, in architecture, the system can be implemented as follows. Providing a DMT receiver in communication with an analog to digital converter (ADC) in the downstream data path. The ADC in further communication with a phase locked-loop (PLL) which completes a feedback loop by correcting the timing in the ADC.

In a preferred embodiment, a carefully chosen scrambler seed is used in generating the C-REVERB, C-SEGUE, and C-MEDLEY signals in the transmitter such that the phase offsets in the pilot tone are minimized.

In a second embodiment, a state machine, already needed in DSL modems, controls the base timing recovery system. The state machine may be configured to recognize the far-end signal and to compensate for the pilot tone phase offset accordingly.

In another embodiment, a symbol synchronizer, also needed in DMT DSL modems, rather than a state machine, may be used to control the base timing recovery system. The symbol synchronizer may be configured to receive the far-end signal and to recognize when the cyclic prefix is present. The symbol synchronizer is further configured to squelch the cyclic prefix in the far-end signal from the input to the PLL.

In another time-domain embodiment an equalizer becomes part of the timing recovery system. The channel shortening time-domain equalizer may be configured to confine the cyclic prefix within the 32-sample period and to feeds its output to the timing recovery PLL with the cyclic prefix squelched.

A final embodiment further integrates a DFT in the timing recovery system to estimate the pilot tone phase error in the frequency domain. The pilot tone phase error is applied to a modified PLL (the band-pass filter and local oscillator are no longer required having been replaced by the DFT).

The present invention can also be viewed as providing a method for reducing pilot tone phase interference during initialization and show time at the receiver in a discrete multi-tone (DMT) communications system. A first method focuses on generating a set of signals at the ATU-C that will result in significant reduction of the pilot tone phase interference when the cyclic prefix is added. In this regard, the method can be summarized by the following steps: generating C-REVERB, C-SEGUE, and C-MEDLEY with the pseudo-random pattern generator as specified by the ADSL standard but using an initial seed different from that specified by the standard when transmitting the three signal types in the DMT standard initialization sequence. A good seed has been found to be 90 (00101 1010 in binary, or 0x05A in hexadecimal), which results in phase offset of approximately 0.01° for C-REVERB and C-SEGUE.

The remaining methods focus on the timing recovery process within the ATU-R receiver and require no modification to the ATU-C transmitter. In a preferred embodiment, a method for timing recovery can be broadly summarized by the following steps: receiving signals through an analog to digital converter (ADC); recognizing the signal type being transmitted by the ATU-C; compensating the phase offset in the timing recovery PLL based on the signal type; and tracking the downstream signal timing by adjusting the ADC sampling time.

A second preferred embodiment can be summarized by the following steps: receiving signals through an analog to digital converter (ADC); detecting the cyclic prefix, if it is present; zeroing out the cyclic prefix portion of the signal before feeding it to the timing recovery phase locked-loop; and using the PLL output to track the downstream signal timing by adjusting the ADC sampling time.

A third embodiment can be summarized as follows: receiving signals through an analog to digital converter (ADC); performing a time-domain equalization on the received data stream and removing the cyclic prefix; feeding the equalized signal, with the cyclic prefix portion removed, to the timing recovery phase locked-loop; and using the PLL output to track the downstream signal timing by adjusting the ADC sampling time.

A fourth embodiment of the invention applying a combined time and frequency-domain approach to the problem of timing recovery at the downstream or receiving unit in a DMT communications system timing recovery can be described as follows: receiving digital signals, processing the digital signals through an analog to digital converter (ADC); performing a time-domain equalization on the received data stream and removing the cyclic prefix; estimating the pilot tone phase using a discrete Fourier transform (DFT); applying the estimated pilot tone phase error to the input of the timing recovery phase locked-loop; and the PLL output to track the downstream signal timing by adjusting the ADC sampling time.

Other systems, methods, features, and advantages of the present invention will be or become apparent to one with skill in the art upon examination of the following drawings and detailed description. In particular, the present invention can be directly applied to ADSL upstream timing recovery (loop timing provided by the ATU-C), ADSL over ISDN (e.g., ITU-T G.992.1 Annex B), ADSL co-existing with TCM-ISDN (e.g., ITU-T G.992.1 Annex C), and symmetric DSL co-existing with TCM-ISDN (e.g., ITU-T G.992.1 Annex H). It is intended that all such additional systems, methods, features, and advantages be included within this description, be within the scope of the present invention, and be protected by the accompanying claims.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 5A is a plot illustrating SINC functions for a 544-sample window, where due to the cyclic prefix, the SINC functions cross bin 64 with non-zero amplitudes.

DETAILED DESCRIPTION OF THE PREFERRED EMBODIMENT

Figure 1:
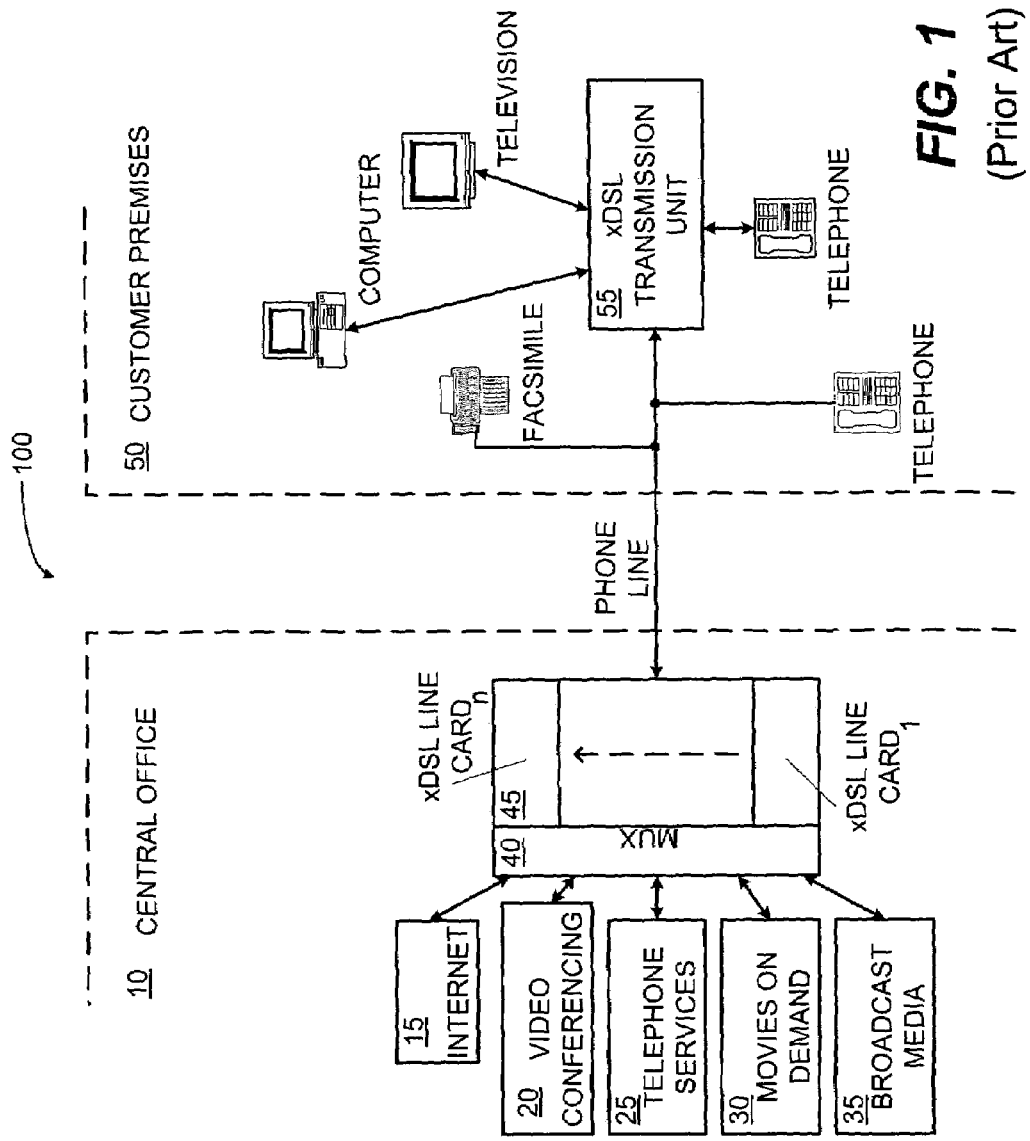
FIG. 1 is a block diagram illustrating the delivery of multiple broadband services via a communications system on a telephone line.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

It will be apparent to one of ordinary skill in the art that the present invention can be applied across the spectrum of digital subscriber line (DSL) systems or any communication system using the DMT or orthogonal frequency division modulation (OFDM). To reflect applicability across the multitude of DSL services, hereinafter, reference to DSL equipment and services will be designated xDSL.

Turning now to the drawings, reference is made to FIG. 1, which illustrates the delivery of broadband communication services via a xDSL over the copper line network. In this regard, a central office 10 is configured to provide broadband services which it assembles via central office xDSL line cards 45 for transmission over a phone line to a customer premises, or another central office 50. Examples of such broadband services are depicted as Internet 15, video conferencing 20, telephone services 25, movies on demand 30, and broadcast media 35. Central office 10 assembles signals from the aforementioned broadband services via multiplexer (mux) 40 for appropriate transformation and transmission by xDSL line cards 45.

Customer premises 50 has a compatible xDSL transmission unit 55 which processes and distributes the several services to appropriate destination devices such as a computer, television, and a telephone as illustrated. It is significant to note that customer premises 50 may have POTS devices such as the facsimile machine and another telephone integrated on the PSTN line along with xDSL transmission unit 55. It is also feasible that the customer premise be another central office location, or a xDSL repeater, where the POTS service may not be available or needed.

Figure 2:
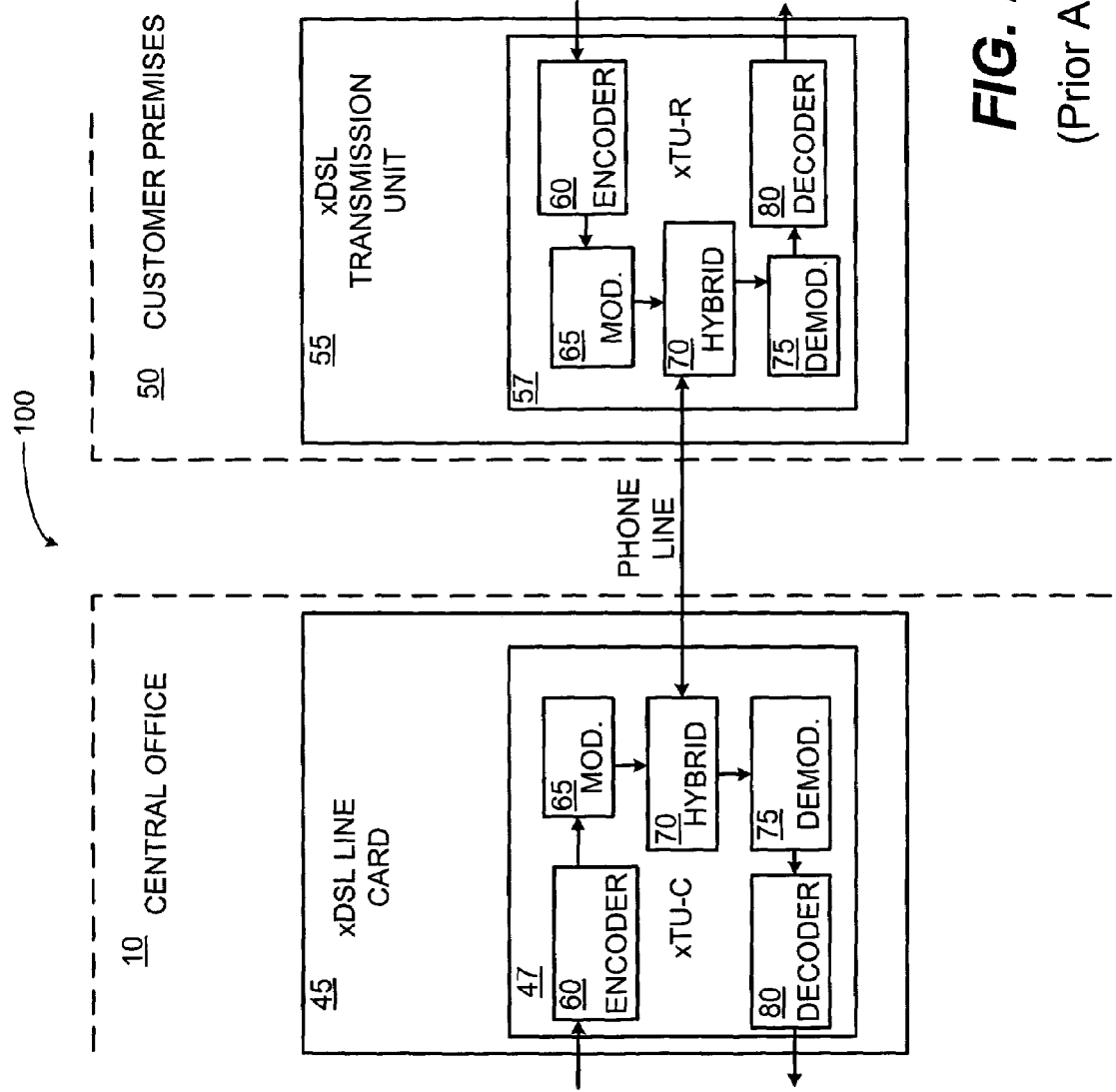
FIG. 2 is a block diagram further illustrating a communications system in accordance with FIG. 1.

Having provided a top level description of a communications system configured to deliver a multitude of broadband services, reference is now made to FIG. 2, which illustrates a portion of an xDSL line card 45 and xDSL transmission unit 55 as shown in FIG. 1. In this regard, xDSL line card 45 contains a xDSL transmission unit—central office, hereinafter xTU-C 47. Similarly, xDSL transmission unit 55 contains a xDSL transmission unit-remote, hereinafter xTU-R 57. Both xTU-C 47 and xTU-R 57 serve to enable two-way communications between xDSL line cards 45 and xDSL transmission unit 55 via the PSTN. Since each xTU is similarly configured, the description herein will address the five common functional blocks only once. Both xTU-C 47 and xTU-R 57 receive digital data in encoder 60. Encoder 60 processes the digital data and forwards it to modulator 65, implemented with an inverse discrete Fourier transform (IDFT) in DMT, which adaptively applies the digital data across the xDSL frequencies. Modulator 65 then forwards a multitude of designated frequencies to hybrid 70 for data transmission along the phone line. In the manner described above, data is assembled, adaptively applied, and transmitted from one xDSL device to another across each of the separate phone lines as the physical characteristics of the environment surrounding each individual system allows.

In full-duplex xDSL transmission over a pair of phone lines, a hybrid circuit is needed to separate the upstream and downstream signals. Hybrid 70 forwards the signal on the phone line to demodulator 75, implemented as a discrete Fourier transform (DFT). Frequently, signal conditioning and equalization are necessary before demodulation. Since these functional blocks are specific to each xDSL implementation, they are not discussed in detail here. Demodulator 75 forwards the digital data to decoder 80. Decoder 80 processes the digital data and distributes it to the appropriate application device.

Figure 3:
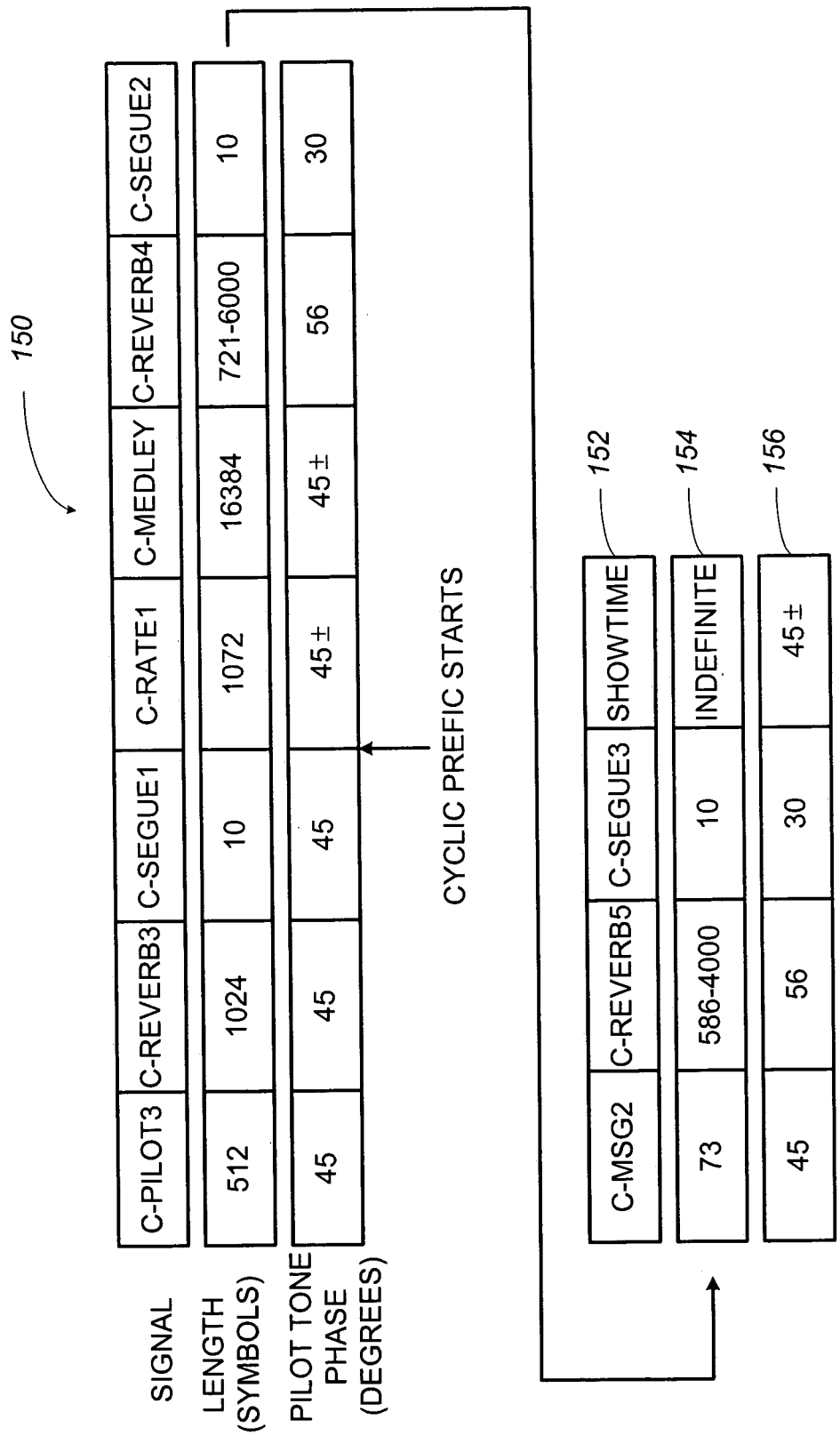
FIG. 3 is a diagram illustrating part of the signal sequence transmitted by the DMT ADSL ATU-C during initialization as defined by the ADSL standards. The ± symbol indicates variation due to the data-driven or pseudo-random nature of the signal segment.

Reference is now made to FIG. 3, which illustrates a portion of the standard DMT ADSL system initialization sequence 150. The diagram of the standard DMT system initialization sequence 150 consists of three rows designated signal 152, length 154, and pilot tone phase 156. Each of the eleven columns illustrated in the diagram of FIG. 3 represent a portion of the DMT system initialization sequence 150, transmitted by the xTU-C, known as a signal segment. The first three columns represent that portion of the initialization sequence where the cyclic prefix is not yet applied. Thereafter, the remaining eight signal segments reveal pilot tone phase deviations from the intended 45° as a result of the introduction of the cyclic prefix. FIG. 3 further illustrates that standard signals C-REVERB and C-SEGUE are most affected by pilot tone phase deviations from the nominal 45°.

Figure 4A:
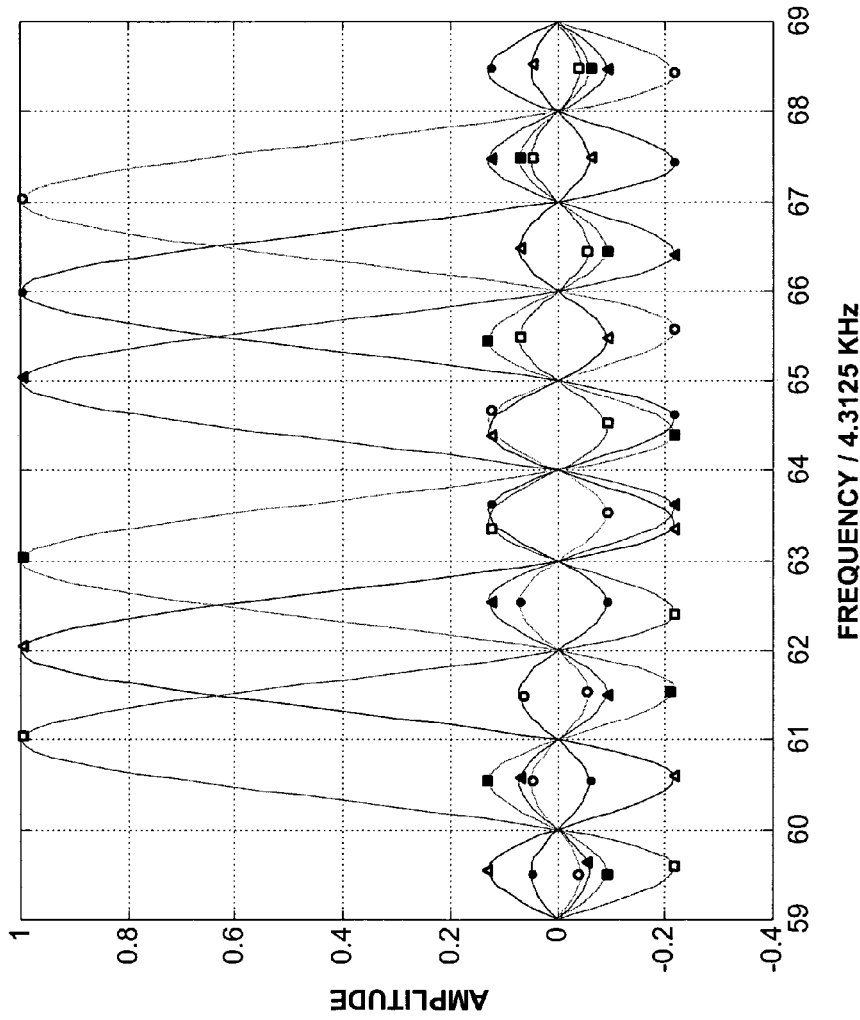
FIG. 4A is a plot illustrating SINC functions for a 512-sample window, where all functions cross bin 64 with zero amplitude.
Figure 4B:
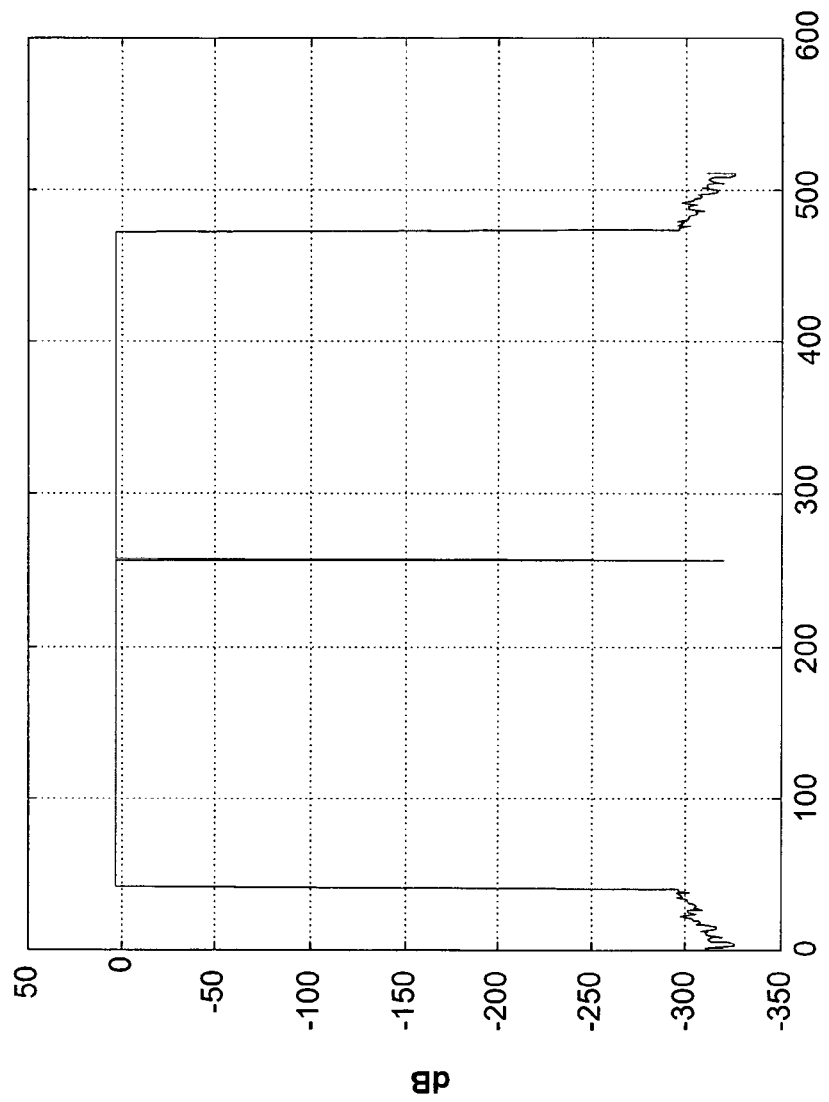
FIG. 4B is a plot illustrating the spectral energy for DMT standard signal C-REVERB without the cyclic prefix applied.
Figure 5B:
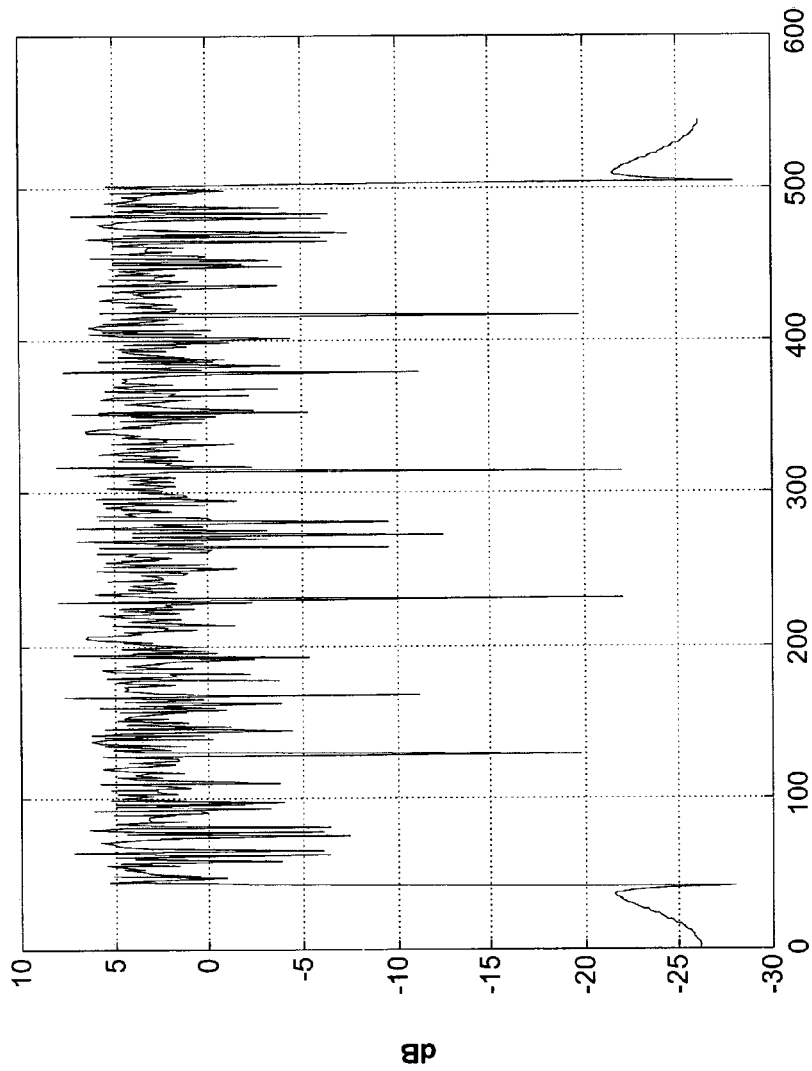
FIG. 5B is a plot illustrating the spectral energy for DMT standard signal C-REVERB with the cyclic prefix applied.

Having highlighted the problem with the introduction of the cyclic prefix in FIGS. 3–5, reference is now directed to a first solution for reducing interference in the pilot tone of a DMT communication system. This first solution focuses on signal processing at the xTU-C and requires a change to the DMT signal standards. C-REVERB and C-SEGUE are both generated using a pseudo-random 511-pattern generator. Instead of using the initial pattern of 511 (0x1 FF), it can be shown that other seed patterns can be implemented to reduce phase interference in the pilot tone. It can be further shown that generating the C-REVERB and C-SEGUE signals with an initial pattern of 90(0x05A) using the same generating polynomial as defined by the DMT ADSL standard, results in a significant reduction in phase interference on the pilot tone.

Using a different initial bit pattern does not cause unexpected problems, since it is just as good as any other one. Using it to generate the signal C-MEDLEY is acceptable as well, since the generating polynomial has a length of 511 and will traverse every non-zero pattern, including 90. For bit pattern 90, the pilot tone deviations come out to be approximately +0.0135° for C-REVERB and −0.0117° for C-SEGUE, negligible for practical purposes. Similarly, this solution can be applied to the optional loop-timing provided by the xTU-C.

Some advantages of this solution are that the pilot tone phase offset in DMT signals C-REVERB and C-SEGUE is completely avoided, the phase error is available once per sample, the timing loop is held tight, and the solution requires no change to the reference timing recovery scheme. However, the solution does not reduce pilot tone phase variance in signals C-MEDLEY or SHOWTIME.

Figure 6:
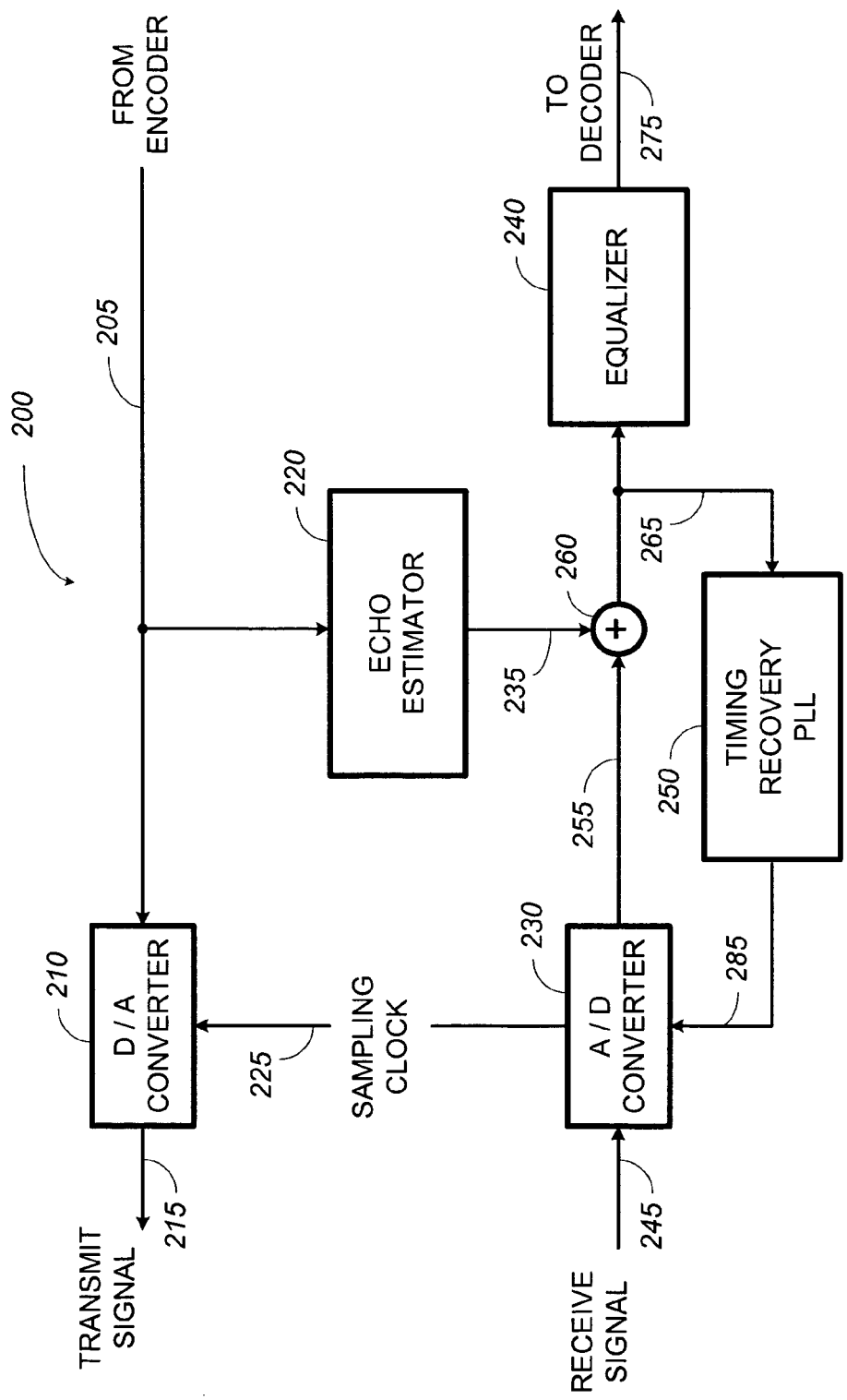
FIG. 6 is a block diagram of a reference timing recovery scheme, which includes an optional echo estimator.

Having described a first solution that focuses on modifying the standard DMT signals as generated at the xTU-C, reference is now directed to solutions that may be implemented at the xTU-R, which do not require any modification to the standards. In this regard, reference is made to FIG. 6. FIG. 6 is a block diagram of a reference timing recovery scheme. The timing recovery scheme 200 focuses on those portions of FIG. 2 that reside between the phone line and the encoder 60 and the decoder 80. In this regard, the timing recovery scheme 200 may contain a digital to analog converter (DAC) 210, an optional echo estimator 220, an analog to digital converter (ADC) 230, an optional summer 260 as part of the optional echo estimator 220, an equalizer 240, and a timing recovery phase locked-loop (PLL) 250.

Receive signal 245, which comprises a plurality of signals, is applied to the input ADC 230. The ADC 230 transforms the analog input signal into a digital sample stream 255 in a manner well known by those skilled in the art of signal processing. The digital sample stream 255 supplied by ADC 230 may be applied to one of two inputs of summer 260. The second input signal to summer 260 may be supplied by echo estimator 220 via echo estimator output signal 235. Echo estimator 220 receives the upstream digital data stream via encoder output signal 205. The echo estimator 220 adaptively applies a signal via echo estimator output signal 235 to the summer 260 that will effectively cancel the leakage or echo inherent in the sample stream 255. The summer 260 combines the two signals in a manner well known by those skilled in the art. The summer output 265 may be further integrated with the inputs to equalizer 240 and the timing recovery PLL 250. It should be understood that the echo estimator 220 described herein is not a necessary component of the timing recovery system, but rather illustrative of how the timing recovery system is implemented, which is well known to those skilled in the art.

The equalizer 240 may be selected from a number of known methods that mitigate the effects of inter-symbol and inter-carrier interference caused by channel distortion in data transmission. After equalization, the received data stream is sent via equalizer output signal 275 for further decoding prior to data delivery to any of a number of application devices.

Timing recovery PLL 250 is a closed-loop tracking synchronizer configured to receive the received far-end signal 265 as its input and to create a timing recovery PLL output signal 285 representing the difference in frequency of the received pilot tone and the timing recovery PLL's local oscillator which is synchronized to the ADC and DAC sampling clocks. The timing recovery scheme 200 may apply the timing recovery PLL output signal 285 to adjust the clock of ADC 230 to provide receiver synchronization at the xTU-R with signals transmitted by the xTU-C.

FIG. 6 further illustrates the coordination of the upstream signal with the downstream signal, known as loop-timing. In this regard, DAC 210 may be in communication with encoder output signal 205 and a sampling clock signal 225 may be derived from the corrected clock within ADC 230 and supplied as the driving clock signal for DAC 210 in the upstream data path. DAC 210 may be further configured to provide a transmit signal 215 via its analog output.

Figure 7:
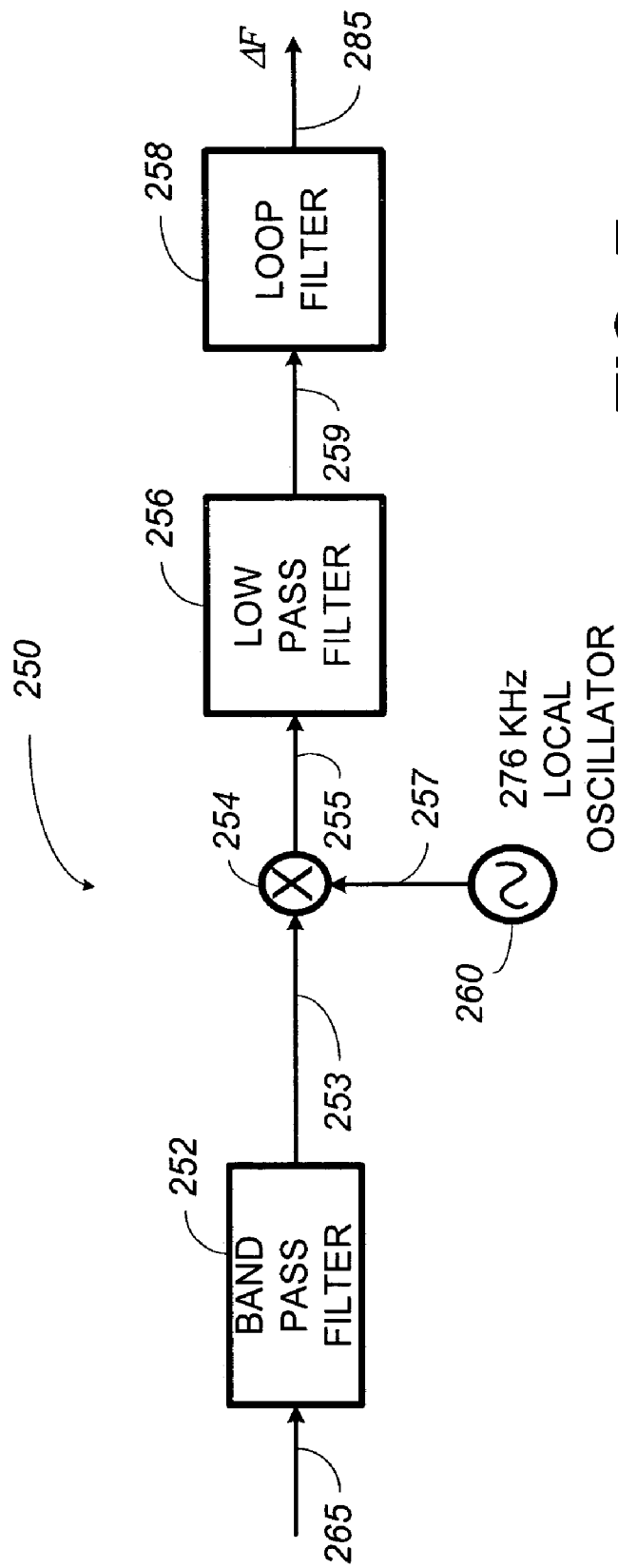
FIG. 7 is a functional block diagram of the timing recovery phase locked-loop of FIG. 6.

Having described the architecture and operation of the timing recovery scheme 200 of FIG. 6, reference is now directed to FIG. 7, which further illustrates the timing recovery PLL 250 of FIG. 6. As shown in FIG. 7, the timing recovery PLL 250 may consist of a band pass filter 252, a mixer 254, a low pass filter 256, a loop filter 258, and a local oscillator 260.

Band pass filter 252 may be configured to receive the far-end signal as its input 265 (see FIG. 6). The band pass filter 252 attenuates frequencies both above and below the expected pilot tone center frequency of 276 kHz. In this way, the band pass filter 252 effectively removes all frequencies except for the downstream pilot tone from the band pass filter output signal 253.

Local oscillator 260 provides a reference signal 257 that may be used throughout the xTU-R as a base frequency synchronized to the ADC and DAC sampling clock. Mixer 254 may be configured to receive both the band pass filter output signal 253 and the local oscillator reference signal 257. The process of mixing the two sinusoids creates a signal whose DC component is proportional to the phase difference between the incoming pilot tone and the local oscillator.

The low-pass filter 256 attenuates all other frequencies other than the low-frequency component from the mixer output signal 255. Low-pass filter 256 may be further configured to communicate this phase error signal via low-pass filter output signal 259 to the loop filter 258.

Loop filter 258 receives the phase error signal 259 at its input and controls the dynamic response of the timing recovery PLL 250 by creating timing recovery PLL output signal 285 in response to the phase error signal 258. In this manner, the timing recovery PLL 250 adjusts the ADC's 230 clock to synchronize the sampling of the downstream signal. In successful timing recovery, the local oscillator becomes synchronized with the downstream pilot tone, since the former is synchronized to the ADC sampling clock by design, resulting in an average zero mixer output.

Having highlighted a basic timing recovery scheme 200 as shown in FIGS. 6 and 7, reference is now directed to a first solution for reducing interference in the pilot tone of a DMT xDSL system that focuses on signal processing at the xTU-R. This first solution introduces a variation to the timing recovery scheme introduced above.

In brief, the first xTU-R solution to the pilot tone phase interference problem compensates for the phase differences in the receiver timing recovery when the transmitter switches signal segments. This is a viable solution because the theoretical, steady state phase jump is known (see FIG. 3). This is a receiver-only solution; the phase-locked loop dynamics are preserved and are independent of symbol synchronization.

Figure 8:
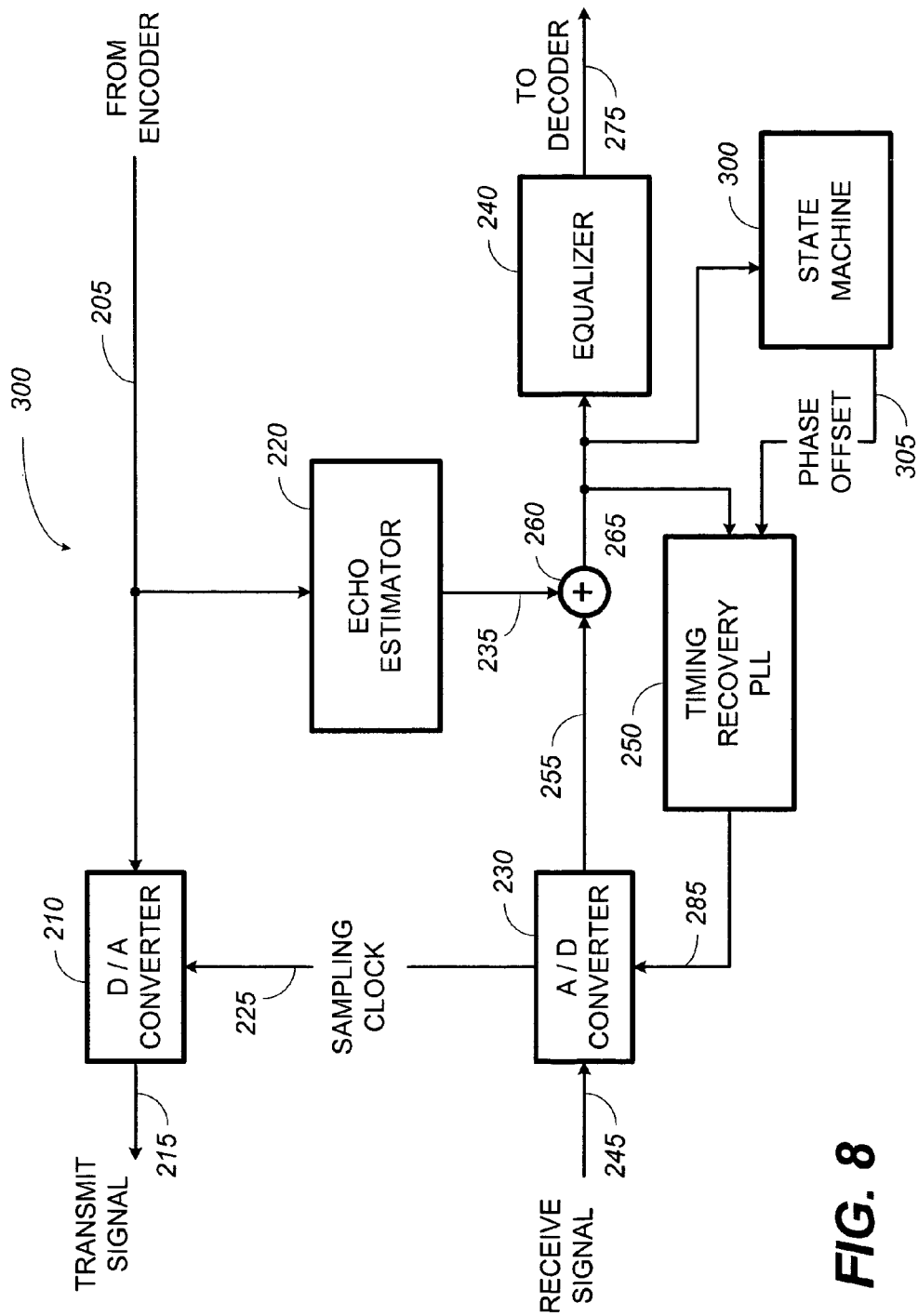
FIG. 8 is a functional block diagram of a timing recovery system consistent with an embodiment of the present invention.

In this regard, FIG. 8 illustrates a functional block diagram of a pilot tone phase stabilizing system consistent with the present invention and the first ATU-R solution introduced above. The pilot tone phase stabilizing system 300 may be constructed using the timing recovery scheme illustrated and described in connection with FIGS. 6 and 7 above by utilizing a state machine 300 in parallel between the summer 260 and the timing recovery PLL 250 as illustrated in FIG. 8. State machine 300 may be configured to adaptively apply a phase offset output signal 305 at the input to the timing recovery PLL 250 in response to the far-end signal 265. By following the steady-state phase error illustrated earlier in FIG. 3, a state machine capable of detecting each of the standard DMT signals in the downstream data may be configured to apply a steady-state phase offset corresponding to the phase offset for the duration of the signal segment. The solution illustrated and described in connection with FIG. 8 can also be applied to xTU-C loop timing.

The solution of FIG. 8 shares many of the advantages and disadvantages as that of the xTU-C solution. Here, the pilot tone phase offset in DMT signals C-REVERB and C-SEGUE is compensated, the phase error is available once per sample, and the timing loop is held tight. This solution, in contrast to the xTU-C solution, requires the utilization of the state machine, which is already needed for implementing initialization. Similar to the xTU-C solution, this phase offset compensation approach does not reduce interference in signals C-MEDLEY or SHOWTIME.

Having described a first xTU-R based solution to the problem of pilot tone phase interference, reference is now directed toward a second solution for reducing interference in the pilot tone of a DMT communication system that focuses on signal processing at the xTU-R. This second solution introduces a second variation to the timing recovery scheme introduced in association with FIGS. 6 and 7 above.

In brief, the second xTU-R solution to the pilot tone phase interference problem consists of removing the cyclic prefix, since it is the root cause of the phase interference, while still performing timing recovery entirely in the time-domain. In this embodiment, the cyclic prefix is removed prior to time-domain equalization. The timing recovery depends on symbol synchronization.

Figure 9:
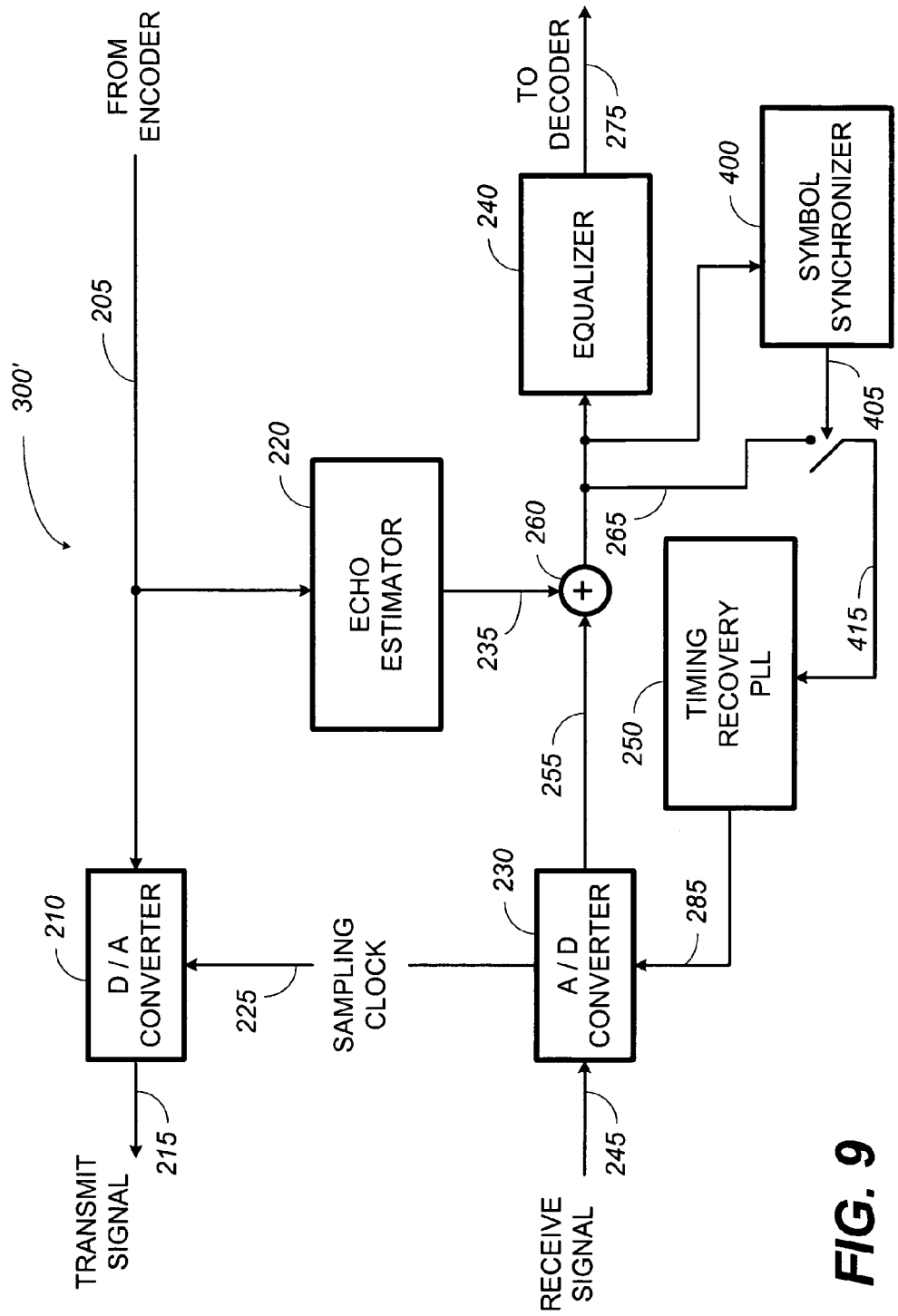
FIG. 9 is a functional block diagram of a timing recovery system consistent with a second embodiment of the present invention.

In this regard, FIG. 9 illustrates a functional block diagram of a timing recovery system 300' consistent with the present invention and a second xTU-R solution introduced above. Timing recovery system 300' may be implemented using the scheme illustrated and described in connection with FIGS. 6 and 7 above by utilizing a symbol synchronizer 400 at the output of the summer 260 and configuring the symbol synchronizer output signal 405 to selectively apply the far-end signal 265 to the input to the timing recovery PLL 415 as illustrated in FIG. 9. In this regard, symbol synchronizer 400 may be configured to apply the far-end signal to the timing recovery PLL 250 when the cyclic prefix is not present. During the cyclic prefix, a signal of zero amplitude may be fed into the timing recovery PLL 250.

The approach implemented and described in association with FIG. 9 has several advantages. First, the timing loop is kept tight and dynamic characteristics preserved. Second, the steady-state interference for C-REVERB and C-SEGUE is greatly reduced (although there may still be transient phase jumps due to the history of the band-pass filter). Third, the interference to the pilot tone is also reduced for standard DMT signals C-MEDLEY and SHOWTIME (from a standard deviation of about 7° to about 4°).

However, the approach implemented in FIG. 9 does not entirely remove phase interference from the pilot tone for C-REVERB and C-SEGUE. It is significant to note the signal applied to the timing recovery PLL 250 in FIG. 9 has not been equalized. As a result of inter-symbol interference in the downstream data stream, the cyclic prefix is not completely removed. As a further result, the pilot tone is still subject to some phase interference.

Having described a second ATU-R based solution to the problem of pilot tone phase interference, reference is now directed toward a third approach for reducing interference in the pilot tone of a DMT communication system that focuses on signal processing at the xTU-R. In brief, the third xTU-R solution to the pilot tone phase interference problem consists of removing the cyclic prefix, since it is the root cause of the problem, after time-domain equalization. Here, as in the previous embodiment, the timing recovery is dependent on symbol synchronization, inherent in time-domain equalization.

Figure 10:
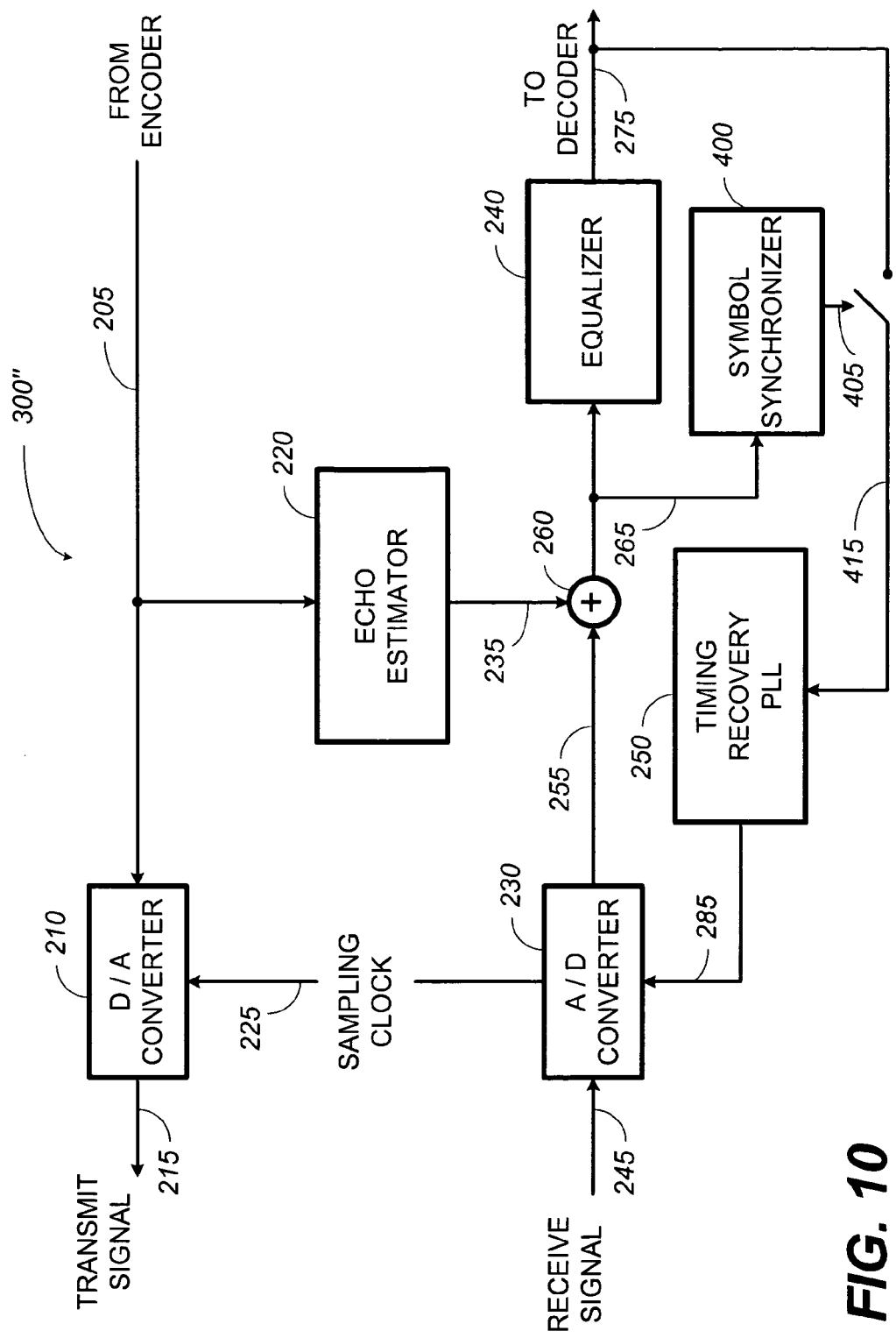
FIG. 10 is a functional block diagram of a timing recovery system consistent with a third embodiment of the present invention.

In this regard, FIG. 10 illustrates a functional block diagram of a timing recovery system 300" consistent with the present invention and a third xTU-R based solution introduced above. The timing recovery system 300" may be implemented using the timing recovery scheme illustrated and described in connection with FIGS. 6 and 7 above by utilizing the symbol synchronizer 400 at the output of the summer 260 and configuring the symbol synchronizer output signal 405 to selectively apply the equalizer output signal 275 to the input to the timing recovery PLL 415 as illustrated in FIG. 10. In this regard, symbol synchronizer 400 may be configured to apply the downstream signal stream to the timing recovery PLL 250 when the cyclic prefix is not present and to apply a signal of zero amplitude during times when the cyclic prefix is present.

The approach implemented and described in association with FIG. 10 has several advantages. First, assuming successful equalization, the pilot tone phase interference effects are completely removed from C-REVERB and C-SEGUE. Second, the interference to the pilot tone is also reduced for standard DMT signals C-MEDLEY and SHOWTIME (from a standard deviation of about 7° to about 4°).

Some disadvantages associated with the approach illustrated in FIG. 10 are as follows. First, timing recovery is dependent upon symbol synchronization. Second, timing recovery occurs after equalization. The combination of the delays resulting from both the synchronization and the equalization procedures makes tracking sluggish.

Having described a third xTU-R based solution to the problem of pilot tone phase interference, reference is now directed toward a fourth approach for reducing interference in the pilot tone of a DMT communication system that focuses on signal processing at the xTU-R. In brief, the fourth xTU-R solution to the pilot tone phase interference problem consists of estimating the phase error in the frequency domain. Any deviation in the frequency domain from 45° on bin 64 is truly the timing phase error. Assuming successful equalization, this approach completely eliminates the interference to the pilot tone for all signal segments. The need for band-pass filtering and demodulation of the pilot tone is also eliminated as the PLL needs to run only once per symbol. In this approach, even though the phase error is available only once per symbol, it has been averaged without bias over the whole symbol by the DFT and is therefore much more reliable than that obtained from a purely time-domain approach, which averages the phase errors blindly.

Figures 11A, 11B:
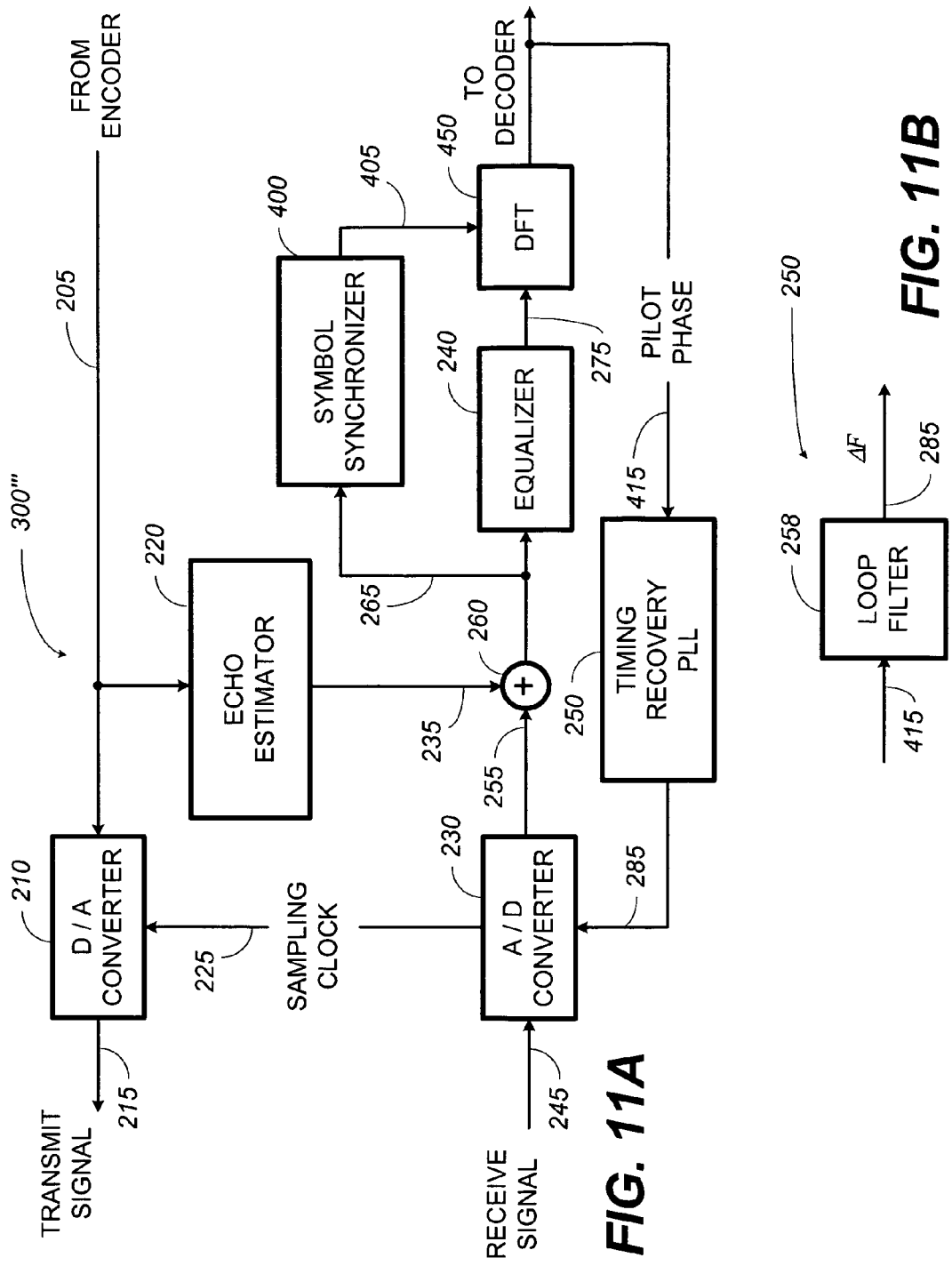
FIG. 11A is a functional block diagram of a timing recovery system consistent with a fourth embodiment of the present invention.
FIG. 11B is a functional block diagram of the phase locked-loop of FIG. 11A.

In this regard, FIG. 11A illustrates a functional block diagram of a timing recovery system 300''' consistent with the present invention and the fourth xTU-R based solution introduced above. The timing recovery system 300''' may be implemented using the timing recovery scheme illustrated and described in connection with FIGS. 6 and 7 above by adding a symbol synchronizer 400 at the output of the summer 260 and a DFT 450 whose input is in communication with the output of the equalizer 240 via equalizer output signal 275. In this embodiment, the symbol synchronizer output signal 405 is configured to selectively apply an input control signal to DFT 450 when the cyclic prefix is not present in the far-end signal stream. The DFT output signal 415 representing an average pilot phase error over each symbol is supplied to the input to the timing recovery PLL 250 once per symbol.

The approach implemented and described in association with FIG. 11 has several advantages. First, assuming successful equalization, the pilot tone phase interference effects are completely removed from all signals originating at the xTU-C. Second, the need for band pass filtering and demodulation of the pilot tone is eliminated. Third, the phase error is more reliable than that derived in the time-domain approaches as the phase error is averaged over the entire symbol by DFT 450.

Some disadvantages associated with the approach illustrated in FIG. 10 are as follows. First, timing recovery is dependent upon symbol synchronization. Second, timing recovery occurs after equalization and processing in a DFT. The combination of the delays resulting from the synchronization, the equalization, and the DFT processing makes tracking even more sluggish than in the last time-domain based embodiment.

FIG. 11B illustrates some further advantages to deriving a phase error in the frequency domain. FIG. 11B is a functional block diagram of the timing recovery PLL 250 of FIG. 11A. It is significant to note that the timing recovery PLL 250 associated with the timing recovery system 300''' no longer requires band pass filtering and demodulation of the pilot tone. As a direct result, the timing recovery PLL 250 associated with timing recovery system 300''' may consist the loop filter 258 in series between the DFT output signal 415 and the input ADC 230.

In this regard, the embodiment or embodiments discussed herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for reducing pilot tone phase interference at the transmitter in a discrete multi-tone (DMT) communications system comprising:
   generating DMT signal segments REVERB and SEGUE with a pseudo-random pattern generator using an initial pattern that minimizes the pilot tone phase offsets in both segments; and
   transmitting the above-defined REVERB and SEGUE signals in the DMT initialization sequence.

2. The method of claim 1, further comprising:
   generating ADSL-over-POTS DMT signal segments C-REVERB and C-SEGUE with a pseudo-random pattern generator polynomial as defined by the ADSL standard but using an initial pattern of 90 (0x05A); and
   transmitting the C-REVERB and C-SEGUE signal in the DMT ADSL standard initialization sequence.

3. A digital signal processor configured to apply the method of claim 1.

4. A method for timing recovery at the receiver in a discrete multi-tone (DMT) communications system comprising:
   receiving a pilot tone generated and transmitted by an associated far-end transmission unit along with other signal streams at a particular receiver;
   converting the plurality of received signals through an analog to digital converter (ADC) to create a digital signal stream;
   detecting a cyclic prefix in the received digital signal stream;
   zeroing out the received digital signal stream from the input to a timing recovery circuit while the cyclic prefix is present in the received signal stream to create a frequency correction signal; and
   using the frequency correction signal to modify the ADC sampling timing.

5. The method of claim 4, further comprising:
   synchronizing a digital to analog converter (DAC) in the transmitting path by using a sampling clock derived from the ADC.

6. The method of claim 4, further comprising:
   performing a time-domain equalization on the received digital signal stream.

7. The method of claim 6, further comprising:
   synchronizing a digital to analog converter (DAC) in the transmitting path by using a sampling clock derived from the ADC.

8. A method for timing recovery at the receiver in a discrete multi-tone (DMT) communications system comprising:
   receiving a standard pilot tone generated and transmitted by an associated far-end transmission unit along with other signal streams at a particular receiver;
   converting the plurality of received signals through an analog to digital converter (ADC) to create a digital signal stream;
   detecting a cyclic prefix in the digital signal stream;
   using the digital signal stream with the cyclic prefix portion removed to generate an average pilot phase error using a discrete Fourier transform (DFT);
   applying the average pilot phase error to the input of a timing recovery circuit to create a frequency correction signal; and
   using the frequency correction signal to modify the sampling time of the ADC.

9. The method of claim 8, further comprising:
   synchronizing a digital to analog converter (DAC) in the transmitting path by using a sampling clock derived from the ADC.

10. A digital signal processor configured to compensate for the offset in phase error on a received pilot tone by sending a signal to a timing recovery circuit based upon a received signal segment in a discrete multi-tone (DMT) system initialization sequence; wherein the received signal segment comprises REVERB and SEGUE segments that have been generated by a pseudo-random pattern generator using an initial pattern that minimizes the pilot tone phase offsets in both segments.

11. The digital signal processor of claim 10, wherein the phase error compensation is accomplished with a state machine.

12. A digital signal processor configured to detect a cyclic prefix from a received digital signal stream at an input to a timing recovery circuit and apply a signal of substantially zero amplitude to the timing recovery circuit when the cyclic prefix is present.

13. The digital signal processor of claim 12, wherein the digital signal processor is further configured to perform a time-domain equalization on the received digital data stream.

14. A system for timing recovery in a discrete multi-tone communications system comprising:
   an analog to digital converter (ADC) configured to create a digital representation of the received signal;
   a timing recovery circuit in communication with the ADC configured to receive the received signal and to apply a control signal to the ADC, wherein the received signal sample stream is synchronized for further processing at a rate compatible with that of a source transmission.; and
   a symbol synchronizer in communication with the ADC configured to determine when the data stream contains a cyclic prefix, the symbol synchronizer further configured to remove the received signal from the timing recovery circuit input when the cyclic prefix is present.

15. The system of claim 14, further comprising:
   a sampling clock in communication with the analog to digital converter, the sampling clock in further communication with a digital to analog converter (DAC) in the transmitting path for synchronizing data transmitted in the reverse direction to the far-end transmission unit.

16. A system for timing recovery in a discrete multi-tone communications system comprising:

an analog to digital converter (ADC) configured to create a digital representation of the received signal;

an equalizer in communication with the ADC, the equalizer configured to perform a time-domain equalization on the received signal;

a timing recovery circuit in communication with the ADC and the equalizer configured to receive the received signal and to apply a control signal to the ADC, wherein the received signal sample stream is synchronized for further processing at a rate compatible with that of a source transmission; and a symbol synchronizer in communication with the ADC configured to determine when the signal stream contains a cyclic prefix, the symbol synchronizer further configured to remove the time-domain equalized signal from the timing recovery circuit input when the cyclic prefix is present.

17. The system of claim 16, further comprising:

a sampling clock in communication with the analog to digital converter, the sampling clock in further communication with a digital to analog converter (DAC) in the transmitting path for synchronizing signal transmitted in the reverse direction to the far-end transmission unit.

18. A system for timing recovery in a discrete multi-tone communications system comprising:

an analog to digital converter (ADC) configured to create a digital representation of the received signal;

an equalizer in communication with the ADC, the equalizer configured to perform a time-domain equalization on the received signal;

a symbol synchronizer in communication with the ADC configured to remove a cyclic prefix from the signal sample stream;

a discrete Fourier transform (DFT) in communication with both the equalizer and the symbol synchronizer, the DFT configured to convert the time-equalized received signal and to generate a pilot tone phase error estimate signal;

a timing recovery circuit in communication with the ADC and the DFT configured to receive the pilot tone phase error estimate and to apply a control signal to the ADC, wherein the received signal sample stream is synchronized for further processing at a rate compatible with that of a source transmission.

19. The system of claim 18, further comprising:

a sampling clock in communication with the analog to digital converter, the sampling clock in further communication with a digital to analog converter (DAC) in the transmitting path for synchronizing signal transmitted in the reverse direction to the far-end transmission unit.

20. A system for timing recovery at the receiver in a discrete multi-tone (DMT) communications system comprising:

means for receiving a standard pilot tone and far-end signal from an associated far-end transmission;

means for converting the plurality of received signals from analog to digital signals;

means for detecting a cyclic prefix in the received far-end signal;

means for removing the cyclic prefix in the received far-end signal;

means for generating an average pilot phase error using a discrete Fourier transform (DFT); and means for applying the average pilot phase error to the input of a timing recovery circuit to create a frequency correction signal; and means for using the frequency correction signal to modify the sampling rate of the analog to digital conversion.

21. A system for timing recovery at the receiver in a discrete multi-tone (DMT) communications system comprising:

means for receiving a standard pilot tone along with a plurality of signals at this particular receiver from a far-end signal;

means for converting the plurality of signals from analog to digital signals;

means for performing a time-domain equalization on the far-end signal;

means for detecting a cyclic prefix in the far-end signal;

means for zeroing out the equalized digital signal from the input to a phase locked-loop while the cyclic prefix is present in the received signal to create frequency correction signal; and means for using the frequency correction signal to modify the sampling rate of the analog to digital conversion.

22. A system for timing recovery at the receiver in a discrete multi-tone (DMT) communications system comprising:

means for receiving a far-end signal along with a plurality of signals at the receiver;

means for converting the plurality of received signals from an analog to a digital format;

means for detecting a cyclic prefix in the far-end signal;
means for zeroing out the far-end signal when the cyclic prefix is present from the input to a timing recovery circuit; and means for using the phase locked-loop output to modify the sampling rate of the analog to digital conversion.

\* \* \* \* \*